United States Patent
Mi et al.

(10) Patent No.: US 12,150,059 B2
(45) Date of Patent: Nov. 19, 2024

(54) METHODS AND APPARATUSES FOR SENDING AND RECEIVING WAKE-UP SIGNAL SEQUENCE

(71) Applicant: HUAWEI TECHNOLOGIES CO., LTD., Guangdong (CN)

(72) Inventors: Xiang Mi, Beijing (CN); Xiaolei Tie, Shanghai (CN); Zhihu Luo, Beijing (CN); Zhe Jin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 363 days.

(21) Appl. No.: 17/671,690

(22) Filed: Feb. 15, 2022

(65) Prior Publication Data

US 2022/0174600 A1   Jun. 2, 2022

Related U.S. Application Data

(63) Continuation of application No. PCT/CN2019/101174, filed on Aug. 16, 2019.

(51) Int. Cl.
*H04W 52/00* (2009.01)
*H04J 13/00* (2011.01)
(Continued)

(52) U.S. Cl.
CPC ..... *H04W 52/0232* (2013.01); *H04J 13/0029* (2013.01); *H04W 68/005* (2013.01)

(58) Field of Classification Search
CPC ............. H04W 52/0232; H04W 68/005; H04J 13/0029
See application file for complete search history.

(56) References Cited

U.S. PATENT DOCUMENTS

2019/0090193 A1   3/2019   Liu et al.
2019/0239189 A1   8/2019   Hwang et al.
(Continued)

FOREIGN PATENT DOCUMENTS

CN   109923914 A   6/2019
WO   2019101539 A1   5/2019

OTHER PUBLICATIONS

3GPP TSG-RAN WG1 #96bis, R1-1904526, UE-group wake-up signal for NB-IoT, Qualcomm Incorporated, Xi'an, China, Apr. 8-12, 2019, total 9 pages.
(Continued)

*Primary Examiner* — Erika A Washington

(57) ABSTRACT

Methods and apparatuses for sending and receiving a wake-up signal sequence are disclosed. The method includes: determining N parameters/parameter for one paging occasion (PO), where the N parameters/parameter correspond(s) to N wake-up signal (WUS) resources/resource in WUS resources associated with the PO, N is an integer greater than or equal to 1, and when N>1, the N parameters are different from each other; generating N WUS sequence sets/set based on the N parameters/parameter, where the N WUS sequence sets/set are separately transmitted on associated resources in the N WUS resources, and each of the N WUS sequence sets includes at least one WUS sequence; and sending at least one sequence in a first WUS sequence set on a first WUS resource, where the first WUS resource is one of the N WUS resources, and the first WUS sequence set is a WUS sequence set transmitted on the first WUS resource.

15 Claims, 8 Drawing Sheets

(51) Int. Cl.
*H04W 52/02* (2009.01)
*H04W 68/00* (2009.01)

(56) References Cited

U.S. PATENT DOCUMENTS

2019/0320490 A1* 10/2019 Liu .................... H04W 72/23
2020/0029302 A1* 1/2020 Cox ................ H04W 52/0216

OTHER PUBLICATIONS

3GPP TS 36.211 V15.4.0: "3rd Generation Partnership Project; Technical Specification Group Radio Access Network; Evolved Universal Terrestrial Radio Access (E-UTRA); Physical channels and modulation (Release 15)", Dec. 2018, total 240 pages.
3GPP TSG RAN WG1 Meeting #96bis, R1-1903909, UE-group wake-up signal, Huawei, HiSilicon, Xi'an, China, Apr. 8-12, 2019, total 9 pages.
3GPP TSG RAN Meeting #80, RP-181451, New WID on Rel-16 enhancements for NB-IoT, Ericsson, Huawei, total 4 pages.
3GPP TSG-RAN WG1 Meeting #90, R1-1714993, Assumptions for NB-IoT power consumption for power saving signal/channel, Ericsson, Prague, Czech Republic, Aug. 21-25, 2017, total 7 pages.
3GPP TS 36.213 V13.14.0, 3rd Generation Partnership Project; Technical Specification Group Radio Access Network; Evolved Universal Terrestrial Radio Access (E-UTRA); Physical layer procedures (Release 13), Jun. 2019, total 396 pages.
3GPP TS 36.304 V15.4.0 (Jun. 2019), 3rd Generation Partnership Project; Technical Specification Group Radio Access Network; Evolved Universal Terrestrial Radio Access (E-UTRA); User Equipment (UE) procedures in idle mode (Release 15), 55 pages.
International Search Report and Written Opinion issued in PCT/CN2019/101174, dated May 19,.
Chinese Office Action for Application No. 201980099142 dated Apr. 14, 2023, 17 pages.
Huawei et al: "UE-group wake-up signal", 3GPP Draft; R1-1901502, Feb. 16, 2019, XP051599199, total 10 pages.
Huawei et al: "UE-group wake-up signal", 3GPP Draft; R1-1905971, May 13, 2019, XP051727428, total 7 pages.
Extended European Search Report issued in EP19942260.1, dated Jul. 11, 2022, 10 pages.

* cited by examiner

METHODS AND APPARATUSES FOR SENDING AND RECEIVING WAKE-UP SIGNAL SEQUENCE

CROSS-REFERENCE TO RELATED APPLICATIONS

This application is a continuation of International Application No. PCT/CN2019/101174, filed on Aug. 16, 2019, the disclosure of which is hereby incorporated by reference in its entirety.

TECHNICAL FIELD

This application relates to communications technologies, and in particular, to methods and apparatuses for sending and receiving a wake-up signal sequence.

BACKGROUND

In a wireless communications system, a communications device has two modes. One mode is a connected mode, indicating that the communications device is connected to a network device and can directly communicate with the network device; and the other mode is an idle mode or referred to as a sleep mode, in which the communications device cannot directly communicate with the network device. To ensure that the network device effectively finds the communications device in the idle mode, the network device usually performs paging, that is, regularly sends a paging signal to the communications device, to indicate whether the communications device needs to switch from the idle mode to the connected mode, to facilitate communication with the network device. As shown in FIG. 1, a communications device in an idle mode regularly wakes up to monitor a paging signal, and a cycle of regular wake-up is referred to as a discontinuous reception (DRX) cycle, where the DRX cycle may be indicated to the communications device through a system message. An occasion at which the communications device wakes up in the DRX cycle is referred to as a paging occasion (PO). The communications device in the idle mode is in sleep for most of the time of the DRX cycle, and wakes up only at a PO to detect a physical downlink control channel (PDCCH). The communications device detects first in a paging common search space (Paging CSS). If a PDCCH is detected in the paging CSS, the communications device receives a physical downlink shared channel (PDSCH) based on indication information carried on the detected PDCCH; or if no PDCCH is detected in the paging CSS, the communications device does not need to further receive a PDSCH.

For the narrow band internet of things (NB-IoT), a wake-up signal (WUS) is introduced in R15, and the WUS is used to indicate whether a communications device needs to wake up at a PO to detect a PDCCH. As shown in FIG. 2, on a network device side, when a network device needs to page a communications device or system a message change, the network device sends a WUS before at least one gap before a PO; otherwise, the network device does not send any signal. On a communications device side, a WUS is monitored before a PO, and if a WUS is detected, a communications device will monitor a PDCCH at the PO; or if no WUS is detected, the communications device does not monitor a PDCCH at the PO.

For the NB-IoT, it is specified in R15 that there is one gap between an end of a maximum WUS duration and a start of a PO, which is also referred to as a WUS gap. A network device can configure three gaps at most. As shown in FIG. 3, a network device configures communications devices into two types, namely, a DRX communications device and an eDRX communications device, based on capacities of communications devices. A DRX gap corresponding to the DRX communications device is from a set {40 ms, 80 ms, 160 ms, 240 ms}, an eDRX short gap corresponding to the eDRX communications device is from a set {40 ms, 80 ms, 160 ms, 240 ms}, and an eDRX long gap corresponding to the eDRX communications device is from a set {1s, 2s}.

A communications device calculates a PO to which the communications device belongs based on an identity (ID), and a plurality of communications devices may belong to a same PO. According to a present protocol, a network device sends a WUS when paging any communications device within a PO, and once the WUS is detected by a communications device, the communications device is woken up. For example, it is assumed that 100 communications devices (with serial numbers 0 to 99) belong to a same PO, and the network device sends a WUS before the PO if the network device needs to wake up a communications device 0. If the WUS is detected by all the 100 communications devices, the 100 communications devices are all woken up. However, the communications devices 1 to 99 actually do not need to be woken up. Therefore, the WUS is a "false alarm" for the communications devices 1 to 99. This causes an increase of power consumption of the communications devices.

In R16, a concept of grouping is introduced for NB-IoT. To be specific, for a plurality of communications devices belonging to a same PO, different communications devices corresponding to different WUS sequences are grouped on a same time-frequency resource. For example, it is assumed that 100 communications devices (with serial numbers 0 to 99) belong to a same PO, and the 100 communications devices are divided into 4 groups. For example, communications devices 0 to 24 belong to a group 0, communications devices 25 to 49 belong to a group 1, communications devices 50 to 74 belong to a group 2, and communications devices 75 to 99 belong to a group 3. There are four WUS sequences, the network device sends a WUS sequence corresponding to the group 0 before the PO to wake up the communications device 0. All the communications devices 0 to 24 in the group 0 detect the WUS sequence and are all woken up. The other 75 communications devices in the groups 1, 2, and 3 are not woken up because the communications devices only monitor WUSs corresponding to the groups to which the communications devices belong.

Further, it is specified in R16 that a network device may configure at most two group WUS resources for a same gap, namely, a new WUS resource and a legacy WUS resource, and the new WUS resource is before the legacy WUS resource. When monitoring a WUS before a PO, a communications device only performs monitoring on a group WUS resource. WUS sequence sets sent by a network device in different gaps and on different group WUS resources are the same. For example, it is assumed that a DRX gap is equal to 40 ms, a eDRX short gap is equal to 160 ms, a maximum WUS duration is equal to 128 ms, and a UE time offset is equal to 10 ms. As shown in FIG. 4, it is assumed that a communications device needs to monitor WUS sequences in an eDRX short gap and on a legacy WUS resource. As shown in FIG. 5, it is assumed that a network device sends WUS sequences only in a DRX gap and on a new WUS resource, and the WUS sequences from the network device are not sent to the communications device. However, the WUS sequences of "the DRX gap and the new WUS resource" can actually be detected by the communications device, which causes a false alarm. Then the communications device detects a PDCCH at a PO, which causes an increase of power consumption.

SUMMARY

Embodiments of this application provide methods and apparatuses for sending and receiving a wake-up signal sequence, to ensure that WUS sequence sets transmitted on various WUS resources are not exactly the same, thereby avoiding a WUS false alarm of a communications device and reducing power consumption of the communications device.

According to a first aspect, an embodiment of this application provides a method for sending a wake-up signal sequence, where the method includes:

determining N parameters/parameter for one paging occasion (PO), where the N parameters/parameter correspond to N WUS resources/resource in wake-up signal (WUS) resources associated with the PO, N is an integer greater than or equal to 1, and when N>1, the N parameters are different from each other; generating N WUS sequence sets/set based on the N parameters/parameter, where the N WUS sequence sets/set are separately transmitted on associated resources in the N WUS resources/resource, and each of the WUS sequence sets includes at least one WUS sequence; and sending at least one sequence in a first WUS sequence set on a first WUS resource, where the first WUS resource is one of the N WUS resources/resource, and the first WUS sequence set is a WUS sequence set transmitted on the first WUS resource.

In the present disclosure, WUS sequence sets transmitted on different WUS resources are calculated by using different parameters, to ensure that WUS sequence sets transmitted on various WUS resources are not exactly the same, where different WUS sequences are used especially on N WUS resources/resource that have an intersection set of time, to avoid a WUS false alarm of a communications device and reduce power consumption of the communications device.

In a possible implementation, the first WUS resource is associated with at least one group of communications devices, and at least one WUS sequence in the first WUS sequence set corresponds to the at least one group of communications devices.

In a possible implementation, the generating of the N WUS sequence sets/set based on the N parameters/parameter includes: obtaining a first Gold seed through calculation based on a first parameter, where the first parameter corresponds to the first WUS resource; and obtaining the first WUS sequence set through calculation based on the first Gold seed.

In a possible implementation, the first Gold seed obtained through calculation based on the first parameter satisfies the following formula:

$$c_{init\_WUS} = N_{ID} \times 2^{29} +$$
$$(N_{ID}^{Ncell} + 1) \times \left(\left(10 n_{f\_start\_PO} + \left\lfloor \frac{n_{s\_start\_PO}}{2} \right\rfloor\right) \bmod 2048 + 1\right) \times 2^9 + N_{ID}^{Ncell},$$

where $c_{init\_WUS}$ represents the first Gold seed, $N_{ID}$ represents the first parameter, $N_{ID}^{Ncell}$ represents a cell identifier, $n_{f\_start\_PO}$ represents a frame number of a first frame in which a PO corresponding to the first WUS sequence set is located, and $n_{s\_start\_PO}$ represents a slot number of a first slot in which the PO corresponding to the first WUS sequence set is located.

In a possible implementation, the generating of the N WUS sequence sets/set based on the N parameters/parameter includes: obtaining a first cover mode through calculation based on a first parameter, where the first parameter corresponds to the first WUS resource; and obtaining the first WUS sequence set through calculation based on the first cover mode.

In a possible implementation, the first cover mode obtained through calculation based on the first parameter satisfies the following formula:

$$C_{gold}(N_{ID}) = (1 - 2x_0(m \bmod 127))(1 - 2x_1((m+m_1) \bmod 127)), \text{ where}$$

$C_{gold}(N_{ID})$ represents the first cover mode, $N_{ID}$ represents the first parameter, $$m_1 = N_{ID} \left\lfloor \frac{127}{N_{total}} \right\rfloor,$$

$N_{total}=N$, $x_0(i+7)=(x_0(i+4)+x_0(i)) \bmod 2$, $x_1(i+7)=(x_1(i+4)+x_1(i)) \bmod 2$, and both initial values of $x_0(i)$ and $x_1(i)$ are [0000001].

In a possible implementation, the generating of the N WUS sequence sets/set based on the N parameters/parameter includes: generating a Gold sequence; and intercepting a part of sequence corresponding to the first parameter from the Gold sequence to obtain the first WUS sequence set through calculation, where the first parameter corresponds to the first WUS resource.

In a possible implementation, when N is equal to 2, the N WUS resources include the first WUS resource and a second WUS resource, and the first WUS resource and the second WUS resource correspond to a same type of gap of a same PO.

In a possible implementation, when N is equal to 3, the N WUS resources include the first WUS resources, a second WUS resource, and a third WUS resource, the first WUS resource corresponds to a first gap, the second WUS resource corresponds to a second gap, the third WUS resource corresponds to a third gap, and the first gap, the second gap, and the third gap are three types of gaps of a same PO.

According to a second aspect, an embodiment of this application provides a method for receiving a wake-up signal sequence, where the method includes:

determining a first parameter, where the first parameter corresponds to a first WUS resource, and the first WUS resource is configured by a network device and is associated with a paging occasion (PO); generating a first WUS sequence based on the first parameter; the first WUS sequence is monitored on the first WUS resource; and detecting a PDCCH at the PO when the first WUS sequence is detected on the first WUS resource.

In embodiments of the present disclosure, WUS sequence sets transmitted on different WUS resources are calculated by using different parameters, to ensure that WUS sequence sets transmitted on various WUS resources are not exactly the same, where different WUS sequences are used especially on N WUS resources/resource that have an intersection set of time, to avoid a WUS false alarm of a communications device and reduce power consumption of the communications device.

In a possible implementation, the generating of a first WUS sequence based on the first parameter includes: obtaining a first Gold seed through calculation based on a first parameter; and obtaining the first WUS sequence through calculation based on the first Gold seed.

In a possible implementation, the first Gold seed obtained through calculation based on the first parameter satisfies the following formula:

$$c_{init\_WUS} = N_{ID} \times 2^{29} +$$
$$(N_{ID}^{Ncell} + 1) \times \left( \left(10 n_{f\_start\_PO} + \left\lfloor \frac{n_{s\_start\_PO}}{2} \right\rfloor \right) \bmod 2048 + 1 \right) \times 2^9 + N_{ID}^{Ncell},$$

where
$c_{init\_WUS}$ represents the first Gold seed, $N_{ID}$ represents the first parameter, $N_{ID}^{Ncell}$ represents a cell identifier, $n_{f\_start\_PO}$ represents a frame number of a first frame in which a PO corresponding to the first WUS sequence is located, and $n_{s\_start\_PO}$ represents a slot number of a first slot in which the PO corresponding to the first WUS sequence is located.

In a possible implementation, the generating of a first WUS sequence based on the first parameter includes: obtaining a first cover mode through calculation based on a first parameter; and obtaining the first WUS sequence through calculation based on the first cover mode.

In a possible implementation, the first cover mode obtained through calculation based on the first parameter satisfies the following formula:

$$C_{gold}(N_{ID}) = (1 - 2x_0(m \bmod 127))(1 - 2x_1((m+m_1) \bmod 127)), \text{ where}$$

$C_{gold}(N_{ID})$ represents the first cover mode, $N_{ID}$ represents the first parameter, $$m_1 = N_{ID} \left\lfloor \frac{127}{N_{total}} \right\rfloor,$$

$N_{total} = N$, $x_0(i+7) = (x_0(i+4) + x_0(i)) \bmod 2$, $x_1(i+7) = (x_1(i+4) + x_1(i)) \bmod 2$, both initial values of $x_0(i)$ and $x_1(i)$ are [0000001], N indicates a quantity of parameters determined by the network device for one PO, and N is an integer greater than or equal to 1.

In a possible implementation, the generating of a first WUS sequence based on the first parameter includes: generating a Gold sequence; and intercepting a part of sequence corresponding to the first parameter from the Gold sequence to obtain the first WUS sequence through calculation.

According to a third aspect, an embodiment this application provides a method for sending a wake-up signal sequence, where the method includes:
obtaining a group identifier of a first group, where the first group is a group to which a communications device belongs; obtaining a total quantity of WUS sequences configured on a first WUS resource, where the first WUS resource is a resource for the communications device to receive a WUS; generating a WUS sequence of the first group based on the group identifier and the total quantity; and sending the WUS sequence of the first group on the first WUS resource.

In embodiments of this application, more communications devices can be supported by WUS sequences by obtaining a modulus value.

In a possible implementation, the generating of the WUS sequence of the first group based on the group identifier and the total quantity includes: calculating a modulus value based on the group identifier and the total quantity; and generating the WUS sequence of the first group based on the modulus value.

In a possible implementation, the modulus value calculated based on the group identifier and the total quantity satisfies the following formula:

$x = g \bmod M$, where x represents the modulus value, g indicates the group identifier, M indicates the total quantity, and mod is a modulo operation.

According to a fourth aspect, an embodiment of this application provides an apparatus for sending a wake-up signal sequence, where the apparatus includes:
a processing module, configured to: determine N parameters/parameter for one paging occasion (PO), where the N parameters/parameter correspond to N WUS resources/resource in wake-up signal (WUS) resources associated with the PO, N is an integer greater than or equal to 1, and when N>1, the N parameters are different from each other; and generate N WUS sequence sets/set based on the N parameters/parameter, where the N WUS sequence sets/set are separately transmitted on associated resources in the N WUS resources/resource, and each of the WUS sequence sets includes at least one WUS sequence; and a sending module, configured to send at least one sequence in a first WUS sequence set on a first WUS resource, where the first WUS resource is one of the N WUS resources/resource, and the first WUS sequence set is a WUS sequence set transmitted on the first WUS resource.

In a possible implementation, the first WUS resource is associated with at least one group of communications devices, and at least one WUS sequence in the first WUS sequence set corresponds to the at least one group of communications devices.

In a possible implementation, the processing module is further configured to: obtain a first Gold seed through calculation based on a first parameter, where the first parameter corresponds to the first WUS resource; and obtain the first WUS sequence set through calculation based on the first Gold seed.

In a possible implementation, the first Gold seed obtained through calculation based on the first parameter satisfies the following formula:

$$c_{init\_WUS} = N_{ID} \times 2^{29} +$$
$$(N_{ID}^{Ncell} + 1) \times \left( \left(10 n_{f\_start\_PO} + \left\lfloor \frac{n_{s\_start\_PO}}{2} \right\rfloor \right) \bmod 2048 + 1 \right) \times 2^9 + N_{ID}^{Ncell},$$

where
$c_{init\_WUS}$ represents the first Gold seed, $N_{ID}$ represents the first parameter, $N_{ID}^{Ncell}$ represents a cell identifier, $n_{f\_start\_PO}$ represents a frame number of a first frame in which a PO corresponding to the first WUS sequence set is located, and $n_{s\_start\_PO}$ represents a slot number of a first slot in which the PO corresponding to the first WUS sequence set is located.

In a possible implementation, the processing module is further configured to: obtain a first cover mode through calculation based on a first parameter, where the first parameter corresponds to the first WUS resource; and obtain the first WUS sequence set through calculation based on the first cover mode.

In a possible implementation, the first cover mode obtained through calculation based on the first parameter satisfies the following formula:

$$C_{gold}(N_{ID})=(1-2x_0(m \bmod 127))(1-2x_1((m+m_1)\bmod 127)), \text{ where}$$

$C_{gold}(N_{ID})$ represents the first cover mode, $N_{ID}$ represents the first parameter, $$m_1 = N_{ID}\left\lfloor\frac{127}{N_{total}}\right\rfloor,$$

$N_{total}=N$, $x_0(i+7)=(x_0(i+4)+x_0(i))\bmod 2$, $x_1(i+7)=(x_1(i+4)+x_1(i))\bmod 2$, and both initial values of $x_0(i)$ and $x_1(i)$ are [0000001].

In a possible implementation, the processing module is further configured to: generate a Gold sequence; and intercept a part of sequence corresponding to the first parameter from the Gold sequence to obtain the first WUS sequence set through calculation, where the first parameter corresponds to the first WUS resource.

In a possible implementation, when N is equal to 2, the N WUS resources include the first WUS resource and a second WUS resource, and the first WUS resource and the second WUS resource correspond to a same type of gap of a same PO.

In a possible implementation, when N is equal to 3, the N WUS resources include the first WUS resources, a second WUS resource, and a third WUS resource, the first WUS resource corresponds to a first gap, the second WUS resource corresponds to a second gap, the third WUS resource corresponds to a third gap, and the first gap, the second gap, and the third gap are three types of gaps of a same PO.

According to a fifth aspect, an embodiment of this application provides an apparatus for receiving a wake-up signal sequence, where the apparatus includes:
a processing module, configured to: determine a first parameter, where the first parameter corresponds to a first WUS resource, and the first WUS resource is configured by a network device and is associated with a paging occasion (PO); and generate a first WUS sequence based on the first parameter; and a receiving module, configured to: monitor the first WUS sequence on the first WUS resource; and monitor a PDCCH at the PO when the first WUS sequence on the first WUS resource is detected.

In a possible implementation, the processing module is further configured to: obtain a first Gold seed through calculation based on a first parameter; and obtain the first WUS sequence through calculation based on the first Gold seed.

In a possible implementation, the first Gold seed obtained through calculation based on the first parameter satisfies the following formula:

$$c_{init\_WUS} = N_{ID} \times 2^{29} +$$

$$(N_{ID}^{Ncell} + 1) \times \left((10 n_{f\_start\_PO} + \left\lfloor\frac{n_{s\_start\_PO}}{2}\right\rfloor)\bmod 2048 + 1\right) \times 2^9 + N_{ID}^{Ncell},$$

where $c_{init\_WUS}$ represents the first Gold seed, $N_{ID}$ represents the first parameter, $N_{ID}^{Ncell}$ represents a cell identifier, $n_{f\_start\_PO}$ represents a frame number of a first frame in which a PO corresponding to the first WUS sequence is located, and $n_{s\_start\_PO}$ represents a slot number of a first slot in which the PO corresponding to the first WUS sequence is located.

In a possible implementation, the processing module is further configured to: obtain a first cover mode through calculation based on a first parameter; and obtain the first WUS sequence through calculation based on the first cover mode.

In a possible implementation, the first cover mode obtained through calculation based on the first parameter satisfies the following formula:

$$C_{gold}(N_{ID})=(1-2x_0(m \bmod 127))(1-2x_1((m+m_1)\bmod 127)), \text{ where}$$

$C_{gold}(N_{ID})$ represents the first cover mode, $N_{ID}$ represents the first parameter, $$m_1 = N_{ID}\left\lfloor\frac{127}{N_{total}}\right\rfloor,$$

$N_{total}=N$, $x_0(i+7)=(x_0(i+4)+x_0(i))\bmod 2$, $x_1(i+7)=(x_1(i+4)+x_1(i))\bmod 2$, and both initial values of $x_0(i)$ and $x_1(i)$ are [0000001], N indicates a quantity of parameters determined by the network device for one PO, and N is an integer greater than or equal to 1.

In a possible implementation, the processing module is further configured to: generate a Gold sequence; and intercept a part of sequence corresponding to the first parameter from the Gold sequence to obtain the first WUS sequence through calculation.

According to a sixth aspect, an embodiment of this application provides an apparatus for sending a wake-up signal sequence, where the apparatus includes:
a processing module, configured to: obtain a group identifier of a first group to which a communications device belongs; obtain a total quantity of WUS sequences configured on a first WUS resource for the communications device to receive a WUS; and generate a WUS sequence of the first group based on the group identifier and the total quantity; and a sending module, configured to send the WUS sequence of the first group on the first WUS resource.

In a possible implementation, the processing module is further configured to: calculate a modulus value based on the group identifier and the total quantity; and generate the WUS sequence of the first group based on the modulus value.

In a possible implementation, the modulus value calculated based on the group identifier and the total quantity satisfies the following formula:

$$x=g \bmod M, \text{ where}$$

x represents the modulus value, g indicates the group identifier, M indicates the total quantity, and mod is a modulo operation.

According to a seventh aspect, an embodiment of this application provides a network device. The network device includes:
one or more processors; and
a memory, configured to store one or more programs, where
when the one or more programs are executed by the one or more processors, the one or more processors are enabled to implement the method according to any one of the first aspect or the third aspect.

According to an eighth aspect, an embodiment of this application provides a communications device. The communications device includes:

one or more processors; and a memory, configured to store one or more programs, where when the one or more programs are executed by the one or more processors, the one or more processors are enabled to implement the method according to the second aspect.

According to a ninth aspect, an embodiment of this application provides a computer-readable storage medium, including a computer program. When the computer program is executed by a computer, the computer is enabled to perform the method according to any one of the first aspect to the third aspect.

According to a tenth aspect, an embodiment of this application provides a computer program. When the computer program is executed by a computer, the computer is enabled to perform the method according to any one of the first aspect to the third aspect.

DESCRIPTION OF EMBODIMENTS

To make objectives, technical solutions, and advantages of the present disclosure clearer, the following clearly describes the technical solutions in this application with reference to the accompanying drawings in this application.

It is clear that the described embodiments are merely some rather than all of the embodiments of this application. All other embodiments obtained by a person of ordinary skill in the art based on the embodiments of this application without creative efforts shall fall within the protection scope of this application.

In the embodiments, claims, and the accompanying drawings of the present disclosure, terms such as "first" and "second" are merely used for distinction and description, and should not be understood as an indication or implication of relative importance, or as an indication or implication of an order. In addition, terms "include" and "have" and any other variants thereof are intended to cover non-exclusive inclusion, for example, include a series of steps or units. A method, system, product, or device is not necessarily limited to those steps or units that are expressly listed, but may include other steps or units that are not expressly listed or inherent to such a process, method, product, or device.

It should be understood that, in the present disclosure, "at least one (piece)" means one or more, and "a plurality of" means two or more. The term "and/or" is used to describe an association relationship between associated objects, and represents that three relationships may exist. For example, "A and/or B" may represent the following three cases: Only A exists, only B exists, and both A and B exist, where A and B may be singular or plural. The character "I" usually represents an "or" relationship between the associated objects. "At least one of the following items (pieces)" or a similar expression thereof means any combination of these items, including any combination of singular items (pieces) or plural items (pieces). For example, at least one (piece) of a, b, or c may represent a, b, c, "a and b", "a and c", "b and c", or "a, b, and c", where a, b, and c may be singular or plural.

Figure 6:
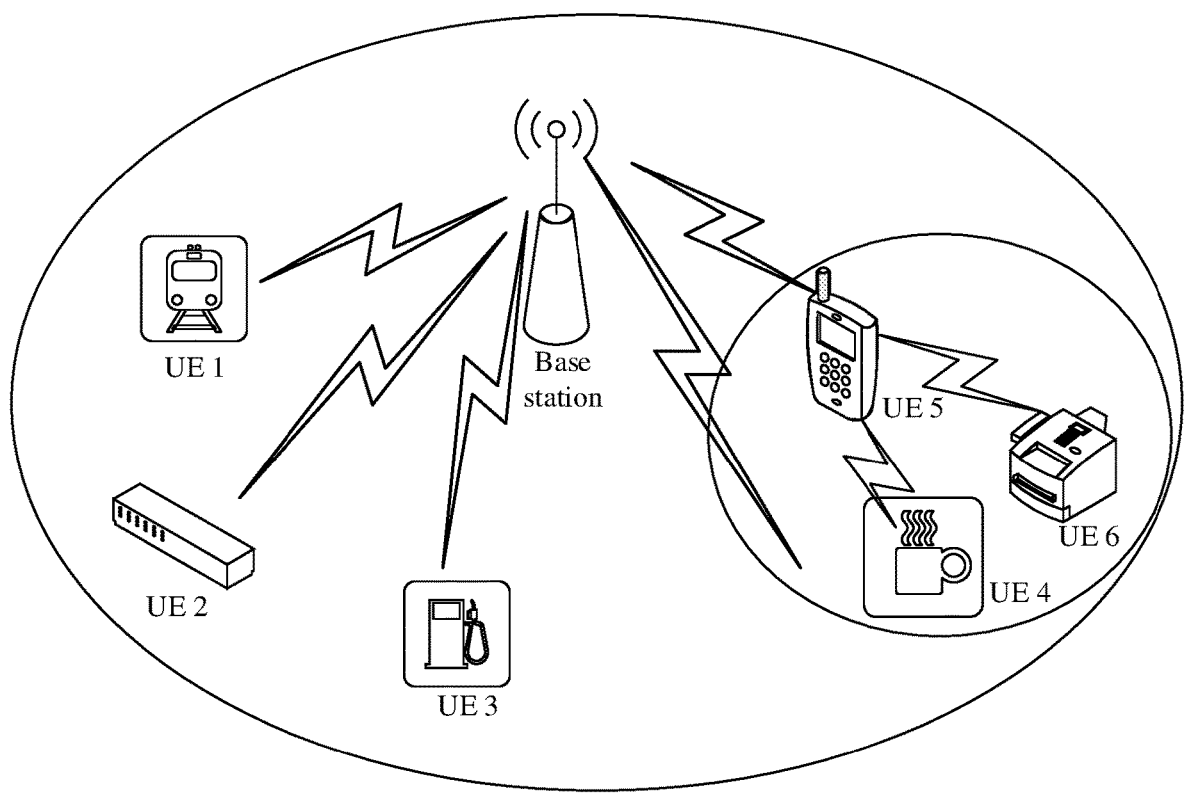
FIG. 6 is a schematic diagram of a communications system to which a method for generating a wake-up signal sequence is applicable according to an embodiment of this application.

FIG. 6 is a schematic diagram of a communications system to which a method for generating a wake-up signal sequence is applicable according to an embodiment of this application. As shown in FIG. 6, the communications system, for example, a long term evolution (LTE) system may include a base station and user equipments (UEs) 1 to 6, and UE 1 to UE 6 send first information to the base station. In addition, UE 4 to UE 6 may further be combined into a communications system. In the communications system, the base station may send downlink information to UE 1, UE 2, UE 3, and UE 5, and UE 5 may further send downlink information to UE 4 and UE 6.

It should be noted that the method for generating a wake-up signal sequence, provided in this application, can be applied to the foregoing LTE system, and can also be applied to another communications system, for example, a 5G NR (new radio) system, a global system for mobile communications (GSM), a mobile telecommunications system (universal mobile telecommunications system, UMTS), a code division multiple access (CDMA) system, a wideband code division multiple access (WCDMA) system, a narrowband internet of things (NB-IoT) system, an enhanced machine-type communications (eMTC) system, and other communications system. When a network device in the communications system needs to send transmission direction indication information, and a communications device needs to receive the indication information and determine a transmission direction within a period of time based on the indication information, the method for generating a wake-up signal sequence, provided in this application, can be used.

The foregoing network device may be configured to group a received air frame and an Internet protocol (IP) and perform mutual conversion. The network device is used as a router between a wireless terminal and a remaining part of an access network, and the remaining part of the access network may include an IP network. The network device may further coordinate attribute management of an air interface. For example, the network device may be a base transceiver station (BTS) in GSM or CDMA, or may be a NodeB (NodeB) in WCDMA, or may be an evolved NodeB (evolutional Node B, eNB or e-NodeB) in LTE. This is not specifically limited in embodiments of this application.

The foregoing communications device may be a device that provides a user with voice and/or data connectivity, a handheld device with a wireless connection function, or another processing device connected to a wireless modem. The communications device may communicate with one or more core networks through a radio access network (RAN). The communications device may be a mobile terminal, such as a mobile phone (also referred to as a "cellular" phone) or a computer with a mobile terminal, or may be a portable, a pocket-sized, a handheld, a computer built-in, or a vehicle-mounted mobile apparatus, which exchanges voice and/or data with the radio access network. For example, the communications device may be a device such as a personal communications service (PCS) phone, a cordless telephone set, a session initiation protocol (SIP) phone, a wireless local loop (WLL) station, or a personal digital assistant (PDA). The communications service may also be referred to as a system, a subscriber unit, a subscriber station, a mobile station, a remote station, an access point, a remote terminal, an access terminal, a user terminal, a user agent, a user device, or user equipment.

Figure 7:
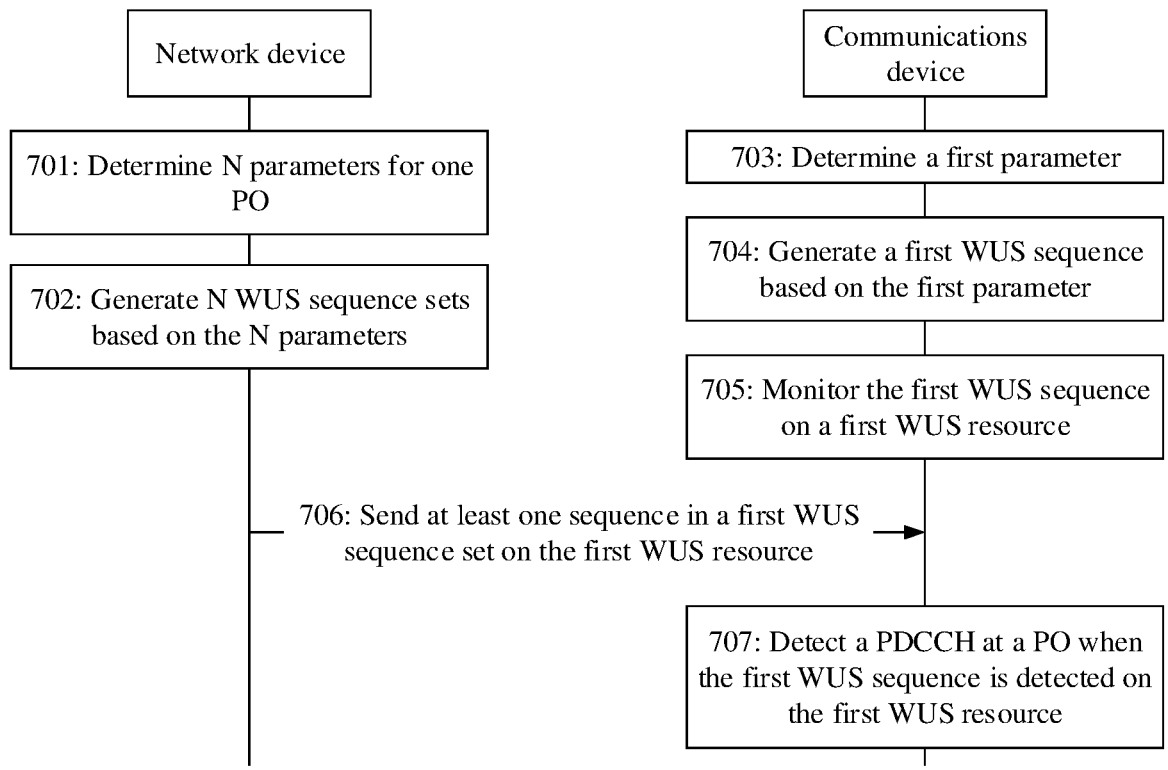
FIG. 7 is a flowchart of embodiment 1 of a method for sending a wake-up signal sequence according to an embodiment of this application.

FIG. 7 is a flowchart of embodiment 1 of a method for sending a wake-up signal sequence according to an embodiment of this application. As shown in FIG. 7, the method of this embodiment may include:

Step 701: A network device determines N parameters/parameter for one PO.

Figure 1:
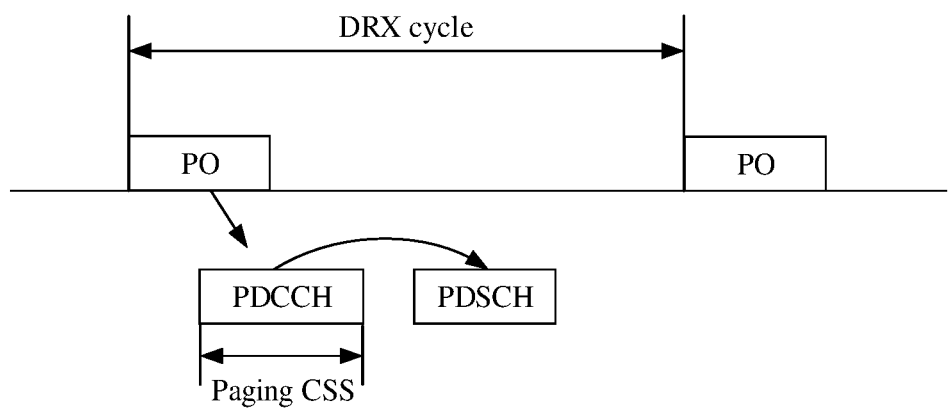
FIG. 1 is a non-limiting example schematic diagram of monitoring a paging signal by a communications device based on a DRX cycle.
Figure 2:
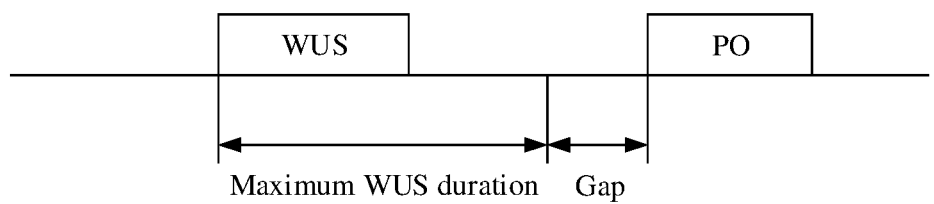
FIG. 2 is a non-limiting example schematic diagram of monitoring a WUS by a communications device.
Figure 3:
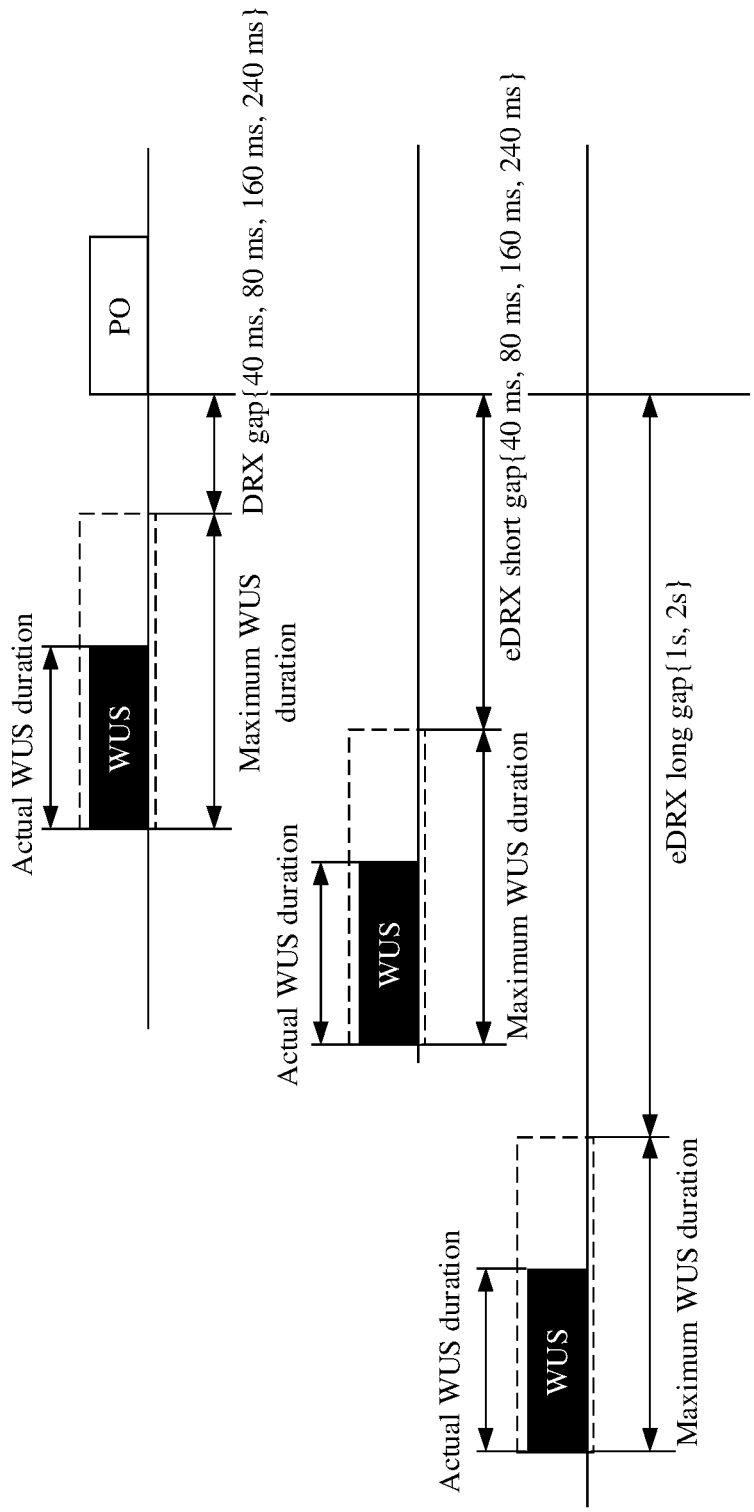
FIG. 3 is a non-limiting example schematic diagram of three gaps configured by a network device.
Figure 5:
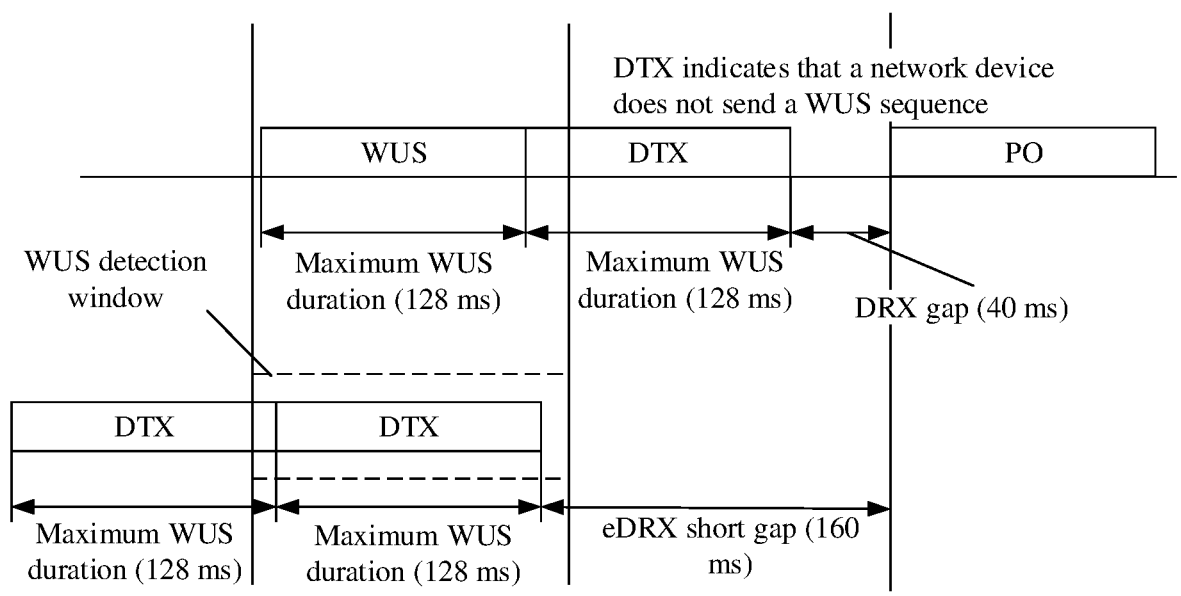

The N parameters/parameter correspond to N WUS resources/resource in wake-up WUS resources associated with the PO, N is an integer greater than or equal to 1, and when N>1, the N parameters are different from each other. For example, as shown in FIG. 3, for a same PO, the network device can configure three gaps at most, namely, a DRX gap, an eDRX short gap, and an eDRX long gap. As shown in FIG. 5, for a same gap, the network device may configure two WUS resources, namely, a new WUS resource and a legacy WUS resource. Based on the foregoing example, N can be a maximum of 6. The six WUS resources may include a new WUS resource and a legacy WUS resource that correspond to a DRX gap, a new WUS resource and a legacy WUS resource that correspond to an eDRX short gap, and a new WUS resource and a legacy WUS resource that correspond to an eDRX long gap. Correspondingly, if the network device configures one parameter for each of the WUS resources, at most six different parameters can be relevant. Optionally, for a same gap, the network device may configure a parameter only for a new WUS resource, and does not configure a parameter for a legacy WUS resource. The WUS resources are differentiated by configuring or not configuring a parameter. Optionally, the network device may further configure a parameter for a legacy WUS resource. All legacy WUS resources may be configured with parameters, or a part of legacy WUS resources is configured with parameters. Parameters for various legacy WUS resources may be different from each other completely, or may be partly the same. Preferably, a parameter configured by the network device for a new WUS resource corresponding to a DRX gap and a parameter configured by the network device for a legacy WUS resource corresponding to an eDRX short gap is different.

Step 702: The network device generates N WUS sequence sets/set based on the N parameters/parameter.

The N WUS sequence sets/set are separately transmitted on associated resources in the N WUS resources/resource, and each of the WUS sequence sets includes at least one WUS sequence. In R16, the concept of grouping is introduced. To be specific, for a plurality of communications devices belonging to a same PO, different communications devices corresponding to different WUS sequences are grouped on a same WUS resource. Therefore, one WUS sequence set can be transmitted on each WUS resource, at least one WUS sequence in the WUS sequence set separately corresponds to one group of communications devices, and communications devices in one group use a same WUS sequence.

In certain embodiments of this application, the network device may use the following several methods to generate a WUS sequence set:

In a first method, the network device obtains a first Gold seed through calculation based on a first parameter, where the first parameter corresponds to the first WUS resource; and a first WUS sequence set is obtained through calculation based on the first Gold seed. The first Gold seed obtained through calculation based on the first parameter satisfies the following formula:

$$c_{init\_WUS} = N_{ID} \times 2^{29} + (N_{ID}^{Ncell} + 1) \times \left(\left(10 n_{f\_start\_PO} + \left\lfloor \frac{n_{s\_start\_PO}}{2} \right\rfloor\right) \bmod 2048 + 1\right) \times 2^9 + N_{ID}^{Ncell},$$

where $c_{init\_WUS}$ represents the first Gold seed, $N_{ID}$ represents the first parameter, $N_{ID}^{Ncell}$ represents a cell identifier, $n_{f\_start\_PO}$ represents a frame number of a first frame in which a PO corresponding to the first WUS sequence set is located, and $n_{s\_start\_PO}$ represents a slot number of a first slot in which the PO corresponding to the first WUS sequence set is located.

For example, Table 1 shows identifiers respectively corresponding to a new WUS resource and a legacy WUS resource. In this method, the network device uses the two identifiers in Table 1 as two parameters respectively corresponding to the new WUS resource and the legacy WUS resource.

TABLE 1

| WUS resource | Identifier |
| --- | --- |
| New WUS resource | 1 |
| Legacy WUS resource | 0 |

For the new WUS resource, $N_{ID}=1$. Therefore, a Gold seed of the new WUS resource satisfies the following formula:

$$c_{init\_WUS} = N_{ID} \times 2^{29} + (N_{ID}^{Ncell} + 1) \times \left(\left(10 n_{f\_start\_PO} + \left\lfloor \frac{n_{s\_start\_PO}}{2} \right\rfloor\right)\right.$$
$$\left. \bmod 2048 + 1\right) \times 2^9 + N_{ID}^{Ncell}$$

-continued $$= 2^{29} + (N_{ID}^{Ncell} + 1) \times \left(\left(10 n_{f\_start\_PO} + \left\lfloor \frac{n_{s\_start\_PO}}{2} \right\rfloor\right)\right)$$

$$\mod 2048 + 1) \times 2^9 + N_{ID}^{Ncell}$$

For the legacy WUS resource, $N_{ID}=0$. Therefore, a Gold seed of the legacy WUS resource satisfies the following formula:

$$c_{init\_WUS} = N_{ID} \times 2^{29} + (N_{ID}^{Ncell} + 1) \times \left(\left(10 n_{f\_start\_PO} + \left\lfloor \frac{n_{s\_start\_PO}}{2} \right\rfloor\right)\right)$$

$$\mod 2048 + 1) \times 2^9 + N_{ID}^{Ncell}$$

$$= (N_{ID}^{Ncell} + 1) \times \left(\left(10 n_{f\_start\_PO} + \left\lfloor \frac{n_{s\_start\_PO}}{2} \right\rfloor\right)\right)$$

$$\mod 2048 + 1) \times 2^9 + N_{ID}^{Ncell}$$

Based on the foregoing Gold seed, the network device may obtain the WUS sequence set through calculation according to a specification in R15. Because the Gold seed is obtained through calculation based on the parameter associated with the WUS resource, the WUS sequence set calculated based on the Gold seed corresponds to the WUS resource.

In a second method, the network device obtains a first cover mode through calculation based on a first parameter, where the first parameter corresponds to the first WUS resource; and a first WUS sequence set is obtained through calculation based on the first cover mode. The first cover mode obtained through calculation based on the first parameter satisfies the following formula:

$C_{gold}(N_{ID})=(1-2x_0(m \mod 127))(1-2x_1((m+m_1)\mod 127))$, where $C_{gold}(N_{ID})$ represents the first cover mode, $N_{ID}$ represents the first parameter, $$m_1 = N_{ID} \left\lfloor \frac{127}{N_{total}} \right\rfloor,$$

$N_{total}=N$, $x_0(i+7)=(x_0(i+4)+x_0(i))\mod 2$, $x_1(i+7)=(x_1(i+4)+x_1(i))\mod 2$, and both initial values of $x_0(i)$ and $x_1(i)$ are [0000001].

For example, in this method, the network device further uses the two identifiers in Table 1 as two parameters respectively corresponding to the new WUS resource and the legacy WUS resource.

For the new WUS resource, $N_{ID}=1$. Therefore, a cover mode of the new WUS resource satisfies the following formula:

$C_{gold}(1)=(1-2x_0(m \mod 127))(1-2x_1((m+m_1)\mod 127))$, where $$m_1 = N_{ID} \left\lfloor \frac{127}{N_{total}} \right\rfloor = \left\lfloor \frac{127}{N_{total}} \right\rfloor.$$

For the legacy WUS resource, $N_{ID}=0$. Therefore, a cover mode of the legacy WUS resource satisfies the following formula:

$C_{gold}(0)=(1-2x_0(m \mod 127))(1-2x_1((m+m_1)\mod 127))$, where $$m_1 = N_{ID} \left\lfloor \frac{127}{N_{total}} \right\rfloor = 0.$$

It is assumed that WUS sequence sets transmitted respectively on the new WUS resource and the legacy WUS resource each includes four WUS sequences, $\{S_0[m],S_1[m],S_2[m],S_3[m]\}$ is used to indicate the WUS sequence set. $S_i[m], i \in \{0,1,2,3\}$ may be referred to as a base sequence. On the basis of the base sequence, the method further comprises calculating a cover mode, that is, $S_i[m] \times C_{gold}(N_{ID})$.

For the new WUS resource, a WUS sequence set is $S_i[m] \times C_{gold}(1)$.

For the legacy WUS resource, a WUS sequence set is $S_i[m] \times C_{gold}(0)$.

Because the cover mode is obtained through calculation based on the parameter associated with the WUS resource, the WUS sequence set calculated based on the cover mode corresponds to the WUS resource.

In a third method, the network device generates a Gold sequence, and intercepts a part of sequence corresponding to the first parameter from the Gold sequence to obtain the first WUS sequence set through calculation, where the first parameter corresponds to the first WUS resource.

Figure 8:
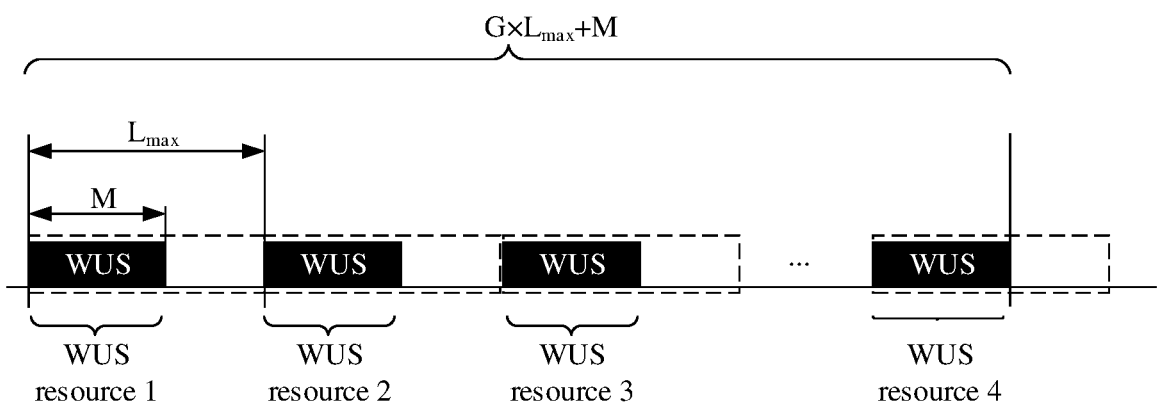
FIG. 8 is a non-limiting example schematic diagram of a corresponding relationship between a Gold sequence and a WUS resource.

For example, in this method, the network device does not change a Gold seed and generates a long Gold sequence (through continue reading). As shown in FIG. 8, in R15, a length of a Gold sequence is a length corresponding to M sub-frames, and a length of a long Gold sequence in this method is a length corresponding to $(G \times L_{max}+M)$ sub-frames, where G indicates a quantity of the intercepted part of sequences, and $L_{max}$ indicates a maximum WUS duration. The network device intercepts, based on an actual requirement, a part of sequence corresponding to the first parameter from the long Gold sequence to obtain the first WUS sequence set through calculation. The network device may intercept parts of sequence, where a quantity of the parts of sequence is the same as a quantity of relevant WUS resources in this method. For example, in FIG. 8, the network device intercepts four parts of sequence from the long Gold sequence and obtains four WUS sequences, and the four WUS sequences each corresponds to one WUS resource.

Figure 4:
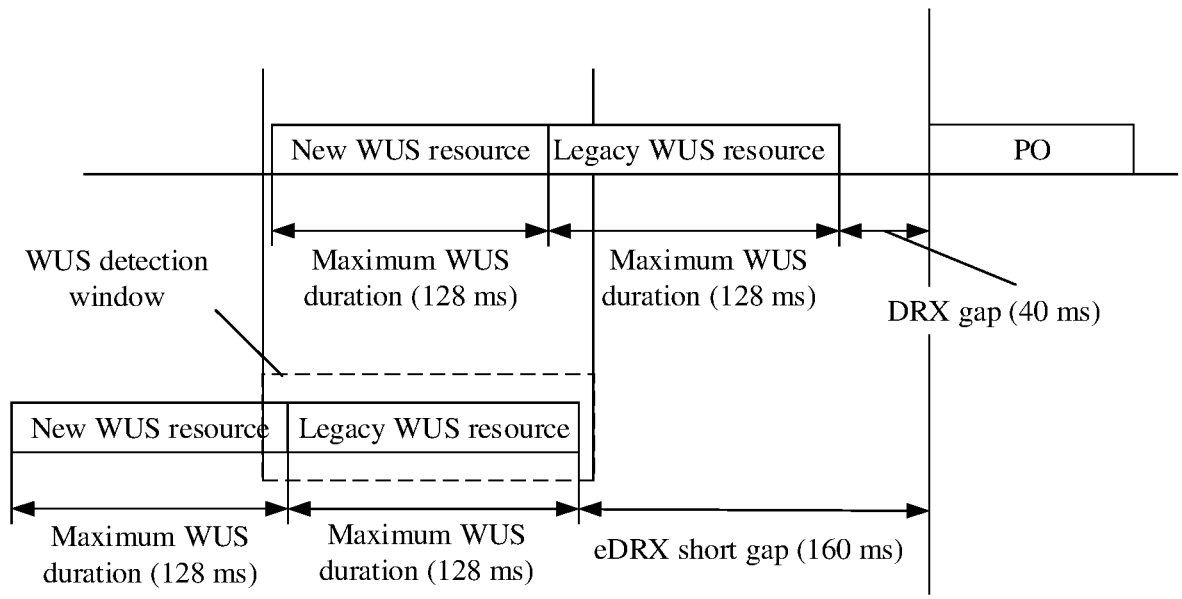
FIG. 4 and FIG. 5 are example schematic diagrams of monitoring a WUS sequence by a communications device according to an embodiment of this application.

By using the foregoing three methods, the network device can transmit different WUS sequence sets on different WUS resources. The best is that there is no any intersection set between the WUS sequence sets transmitted on all the WUS resources. Alternatively, there may be some intersection sets between the WUS sequence sets transmitted on all the WUS resources, but when the network device transmits a WUS sequence, either that no WUS sequence having an intersection set is transmitted on any WUS resource, or that WUS sequences having an intersection set are transmitted only on a WUS resource corresponding to one gap. In this way, a false alarm of the communications device as shown in FIG. 4 and FIG. 5 can be prevented.

It should be noted that in embodiments of this application, the network device can use the foregoing three methods to generate a WUS sequence set, and can use other methods, and the final objective is to ensure that the network device can transmit different WUS sequence sets on different WUS resources. This is not specifically limited in embodiments of the present disclosure.

Step 703: A communications device determines the first parameter.

Corresponding to operations performed by the network device in steps 701 and 702, the communications device in this embodiment also needs to determine, in advance, a WUS sequence to be monitored by the communications device. The first WUS resource is a WUS resource that is configured by the network device and that is associated with a PO, and the first parameter corresponds to the first WUS resource. The network device may configure the first WUS resource and the first parameter for the communications device in advance in a semi-static manner.

Step 704: The communications device generates a first WUS sequence based on the first parameter.

In an embodiment of this application, the three methods in step 702 may also be used in a process of generating the first WUS sequence by the communications device based on the first parameter. The network device configures a related parameter (such as N mentioned above) used in a calculation process in advance, or uses a specified value according to a protocol. A difference is that, for the communications device, because the first parameter is configured by the network device in advance, the communications device may directly obtain, through calculation, the WUS sequence to be monitored, and does not need to calculate an entire WUS sequence set.

For example, in the first and second methods, the first parameter is either 1 corresponding to the new WUS resource or 0 corresponding to the legacy WUS resource, and an exclusive Gold seed or cover mode is further obtained through calculation. In the third method, the first parameter points to a location in the long Gold sequence. Therefore, the intercepted part of sequence is also exclusive.

Step 705: The communications device monitors the first WUS sequence on the first WUS resource.

The communications device wakes up at a fixed time point corresponding to a WUS resource based on a configuration of the network device, and monitors whether a corresponding WUS sequence is received.

Step 706: The network device sends at least one sequence in the first WUS sequence set on the first WUS resource.

When the network device pages the communications device, a WUS sequence corresponding to a group to which the communications device belongs is sent on a WUS resource configured for the communications device, to wake up the communications device to detect a PDCCH at an associated PO.

Step 707: The communications device detects a PDCCH at a PO when the first WUS sequence is detected on the first WUS resource.

Once the corresponding WUS sequence is detected, the communications device detects the PDCCH at the PO.

In a possible implementation, when N is equal to 2, the N WUS resources include the first WUS resource and a second WUS resource, for example, the new WUS resource and the legacy WUS resource, and the first WUS resource and the second WUS resource correspond to a same type of gap of a same PO.

In a possible implementation, when N is equal to 3, the N WUS resources include the first WUS resources, a second WUS resource, and a third WUS resource, the first WUS resource corresponds to a first gap, the second WUS resource corresponds to a second gap, the third WUS resource corresponds to a third gap. For example, there are WUS resources respectively correspond to a DRX gap, an eDRX short gap, and an eDRX long gap. The first gap, the second gap, and the third gap are three types of gaps of a same PO.

In an embodiment of this application, WUS sequence sets transmitted on different WUS resources are calculated by using different parameters, to ensure that WUS sequence sets transmitted on various WUS resources are not exactly the same, where different WUS sequences are used especially on WUS resources that have an intersection set of time, to avoid a WUS false alarm of a communications device and reduce power consumption of the communications device.

Figure 9:
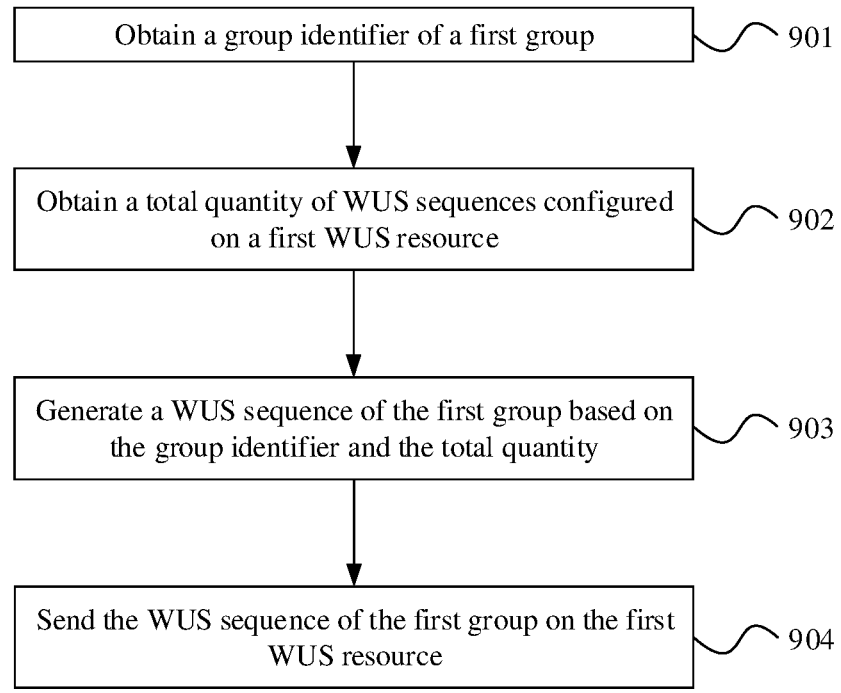
FIG. 9 is a flowchart of embodiment 2 of a method for sending a wake-up signal sequence according to an embodiment of this application.

FIG. 9 is a flowchart of embodiment 2 of a method for sending a wake-up signal sequence according to an embodiment of this application. As shown in FIG. 9, the method of this embodiment may be performed by a network device, and the method for sending a wake-up signal sequence may include:

Step 901: obtaining a group identifier of a first group.

The first group is a group to which a communications device belongs. For example, Table 2 shows a corresponding relationship among a group identifier, a WUS resource, and a WUS sequence set.

TABLE 2

| Group identifier | WUS resource | Base sequence |
| --- | --- | --- |
| {0, 1, 2, 3} | New WUS resource | {$S_0[m]$, $S_1[m]$, $S_2[m]$, $S_3[m]$} |
| {4, 5, 6, 7} | Legacy WUS resource | {$S_4[m]$, $S_5[m]$, $S_6[m]$, $S_7[m]$} |

Groups identified by the group identifiers 0 to 3 are four groups of communications devices on the new WUS resource, a base sequence of each group is respectively {$S_0[m]$, $S_1[m]$, $S_2[m]$, $S_3[m]$}. Groups identified by the group identifiers 4 to 7 are four groups of communications devices on the legacy WUS resource, a base sequence of each group is respectively {$S_4[m]$, $S_5[m]$, $S_6[m]$, $S_7[m]$}.

Step 902: obtaining a total quantity of WUS sequences configured on the first WUS resource.

The first WUS resource is a resource for the communications device to receive a WUS. In the foregoing example, the total quantity of WUS sequences configured on the first WUS resource (the new WUS resource or the legacy WUS resource) is 4.

Step 903: generating a WUS sequence of the first group based on the group identifier and the total quantity.

The network device may calculate the modulus value based on the group identifier and the total quantity, and the modulus value satisfies the following formula:

$$x = g \bmod M, \text{ where}$$

x represents the modulus value, g indicates the group identifier, M indicates the total quantity, and mod is a modulo operation.

The network device generates the WUS sequence of the first group based on the modulus value.

For example, Table 3 shows a result of allocating base sequences to 16 communications devices by the network device.

TABLE 3

| Group identifier | WUS resource | Total quantity of WUS sequences | | Base sequence |
|---|---|---|---|---|
| {0, 1, 2, 3, 4, 5, 6, 7} | New WUS resource | M = 8 | gmodM = {0, 1, 2, 3, 4, 5, 6, 7} | {S$_0$[m], S$_1$[m], S$_2$[m], S$_3$[m], S$_4$[m], S$_5$[m], S$_6$[m], S$_7$[m]} |
| {8, 9, 10, 11, 12, 13, 14, 15} | Legacy WUS resource | M = 8 | gmodM = {0, 1, 2, 3, 4, 5, 6, 7} | {S$_0$[m], S$_1$[m], S$_2$[m], S$_3$[m], S$_4$[m], S$_5$[m], S$_6$[m], S$_7$[m]} |

The network device originally can only allocate eight base sequences to eight communications devices as shown in Table 2, but by using the foregoing method, the network device can allocate eight base sequences to 16 communications devices. In this way, more communications devices can be supported by WUS sequences.

Step 904: sending the WUS sequence of the first group on the first WUS resource.

The network device may send, based on allocation of WUS sequences to each group of communications devices, a WUS sequence of a communications device that needs to be woken up, to activate the communications device.

In this embodiment, more communications devices can be supported by WUS sequences by obtaining a modulus value.

Figure 10:
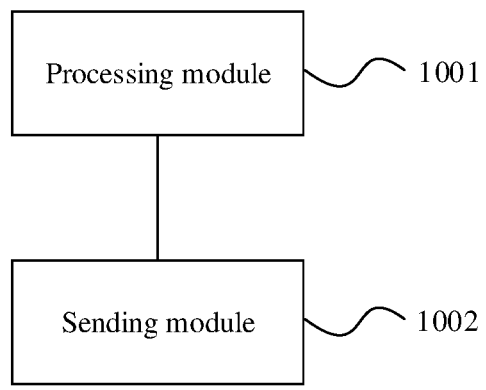
FIG. 10 is a schematic diagram of a structure of an apparatus for sending a wake-up signal sequence according to an embodiment of this application.

FIG. 10 is a schematic diagram of a structure of an apparatus for sending a wake-up signal sequence according to an embodiment of this application. As shown in FIG. 10, the apparatus in this embodiment may be applied to the foregoing network device. The apparatus includes a processing module 1001 and a sending module 1002. The processing module 1001 is configured to: determine N parameters/parameter for one paging occasion (PO), where the N parameters/parameter correspond to N WUS resources/resource in wake-up signal (WUS) resources associated with the PO, N is an integer greater than or equal to 1, and when N>1, the N parameters are different from each other; and generate N WUS sequence sets/set based on the N parameters/parameter, where the N WUS sequence sets/set are separately transmitted on associated resources in the N WUS resources/resource, and each of the WUS sequence sets includes at least one WUS sequence. The sending module 1002 is configured to send at least one sequence in a first WUS sequence set on a first WUS resource, where the first WUS resource is one of the N WUS resources/resource, and the first WUS sequence set is a WUS sequence set transmitted on the first WUS resource.

In a possible implementation, the first WUS resource is associated with at least one group of communications devices, and at least one WUS sequence in the first WUS sequence set corresponds to the at least one group of communications devices.

In a possible implementation, the processing module 1001 is further configured to: obtain a first Gold seed through calculation based on a first parameter, where the first parameter corresponds to the first WUS resource; and obtain the first WUS sequence set through calculation based on the first Gold seed.

In a possible implementation, the first Gold seed obtained through calculation based on the first parameter satisfies the following formula:

$$c_{init\_WUS} = N_{ID} \times 2^{29} + (N_{ID}^{Ncell} + 1) \times \left(\left(10 n_{f\_start\_PO} + \left\lfloor \frac{n_{s\_start\_PO}}{2} \right\rfloor\right) \mod 2048 + 1\right) \times 2^9 + N_{ID}^{Ncell},$$

where $c_{init\_WUS}$ represents the first Gold seed, $N_{ID}$ represents the first parameter, $N_{ID}^{Ncell}$ represents a cell identifier, $n_{f\_start\_PO}$ represents a frame number of a first frame in which a PO corresponding to the first WUS sequence set is located, and $n_{s\_start\_PO}$ represents a slot number of a first slot in which the PO corresponding to the first WUS sequence set is located.

In a possible implementation, the processing module 1001 is further configured to: obtain a first cover mode through calculation based on a first parameter, where the first parameter corresponds to the first WUS resource; and obtain the first WUS sequence set through calculation based on the first cover mode.

In a possible implementation, the first cover mode obtained through calculation based on the first parameter satisfies the following formula:

$C_{gold}(N_{ID})=(1-2x_0(m \mod 127))(1-2x_1((m+m_1)\mod 127))$, where $C_{gold}(N_{ID})$ represents the first cover mode, $N_{ID}$ represents the first parameter, $$m_1 = N_{ID} \left\lfloor \frac{127}{N_{total}} \right\rfloor,$$

$N_{total}$=N, $x_0(i+7)=(x_0(i+4)+x_0(i))\mod 2$, $x_1(i+7)=(x_1(i+4)+x_1(i))\mod 2$, and both initial values of $x_0(i)$ and $x_1(i)$ are [0000001].

In a possible implementation, the processing module 1001 is further configured to: generate a Gold sequence; and intercept a part of sequence corresponding to the first parameter from the Gold sequence, to obtain the first WUS sequence set through calculation, where the first parameter corresponds to the first WUS resource.

In a possible implementation, when N is equal to 2, the N WUS resources include the first WUS resource and a second WUS resource, and the first WUS resource and the second WUS resource correspond to a same type of gap of a same PO.

In a possible implementation, when N is equal to 3, the N WUS resources include the first WUS resources, a second WUS resource, and a third WUS resource, the first WUS resource corresponds to a first gap, the second WUS resource corresponds to a second gap, the third WUS resource corresponds to a third gap, and the first gap, the second gap, and the third gap are three types of gaps of a same PO.

In a possible implementation, the processing module 1001 is further configured to: obtain a group identifier of a first group, where the first group is a group to which a communications device belongs; obtain a total quantity of WUS sequences configured on a first WUS resource, where the first WUS resource is a resource for the communications device to receive a WUS; and generate a WUS sequence of the first group based on the group identifier and the total quantity. The sending module 1002 is further configured to send the WUS sequence of the first group on the first WUS resource.

In a possible implementation, the processing module 1001 is further configured to: calculate a modulus value based on the group identifier and the total quantity; and generate the WUS sequence of the first group based on the modulus value.

In a possible implementation, the modulus value calculated based on the group identifier and the total quantity satisfies the following formula:

$$x = g \bmod M, \text{ where}$$

x represents the modulus value, g indicates the group identifier, M indicates the total quantity, and mod is a modulo operation.

The apparatus in this embodiment may be configured to execute the technical solution in the method embodiment shown in FIG. 7 or FIG. 9. Implementation principles and technical effects are similar to those in the method embodiment, and details are not described herein again.

Figure 11:
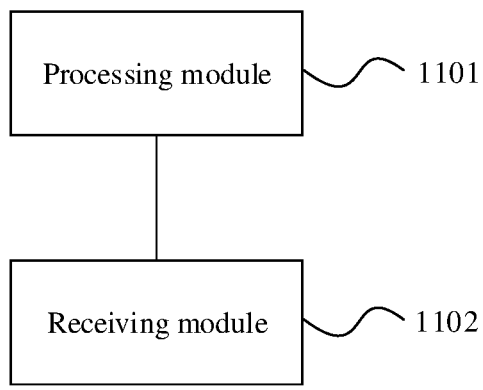
FIG. 11 is a schematic diagram of a structure of an apparatus for receiving a wake-up signal sequence according to an embodiment of this application.

FIG. 11 is a schematic diagram of a structure of an apparatus for receiving a wake-up signal sequence according to an embodiment of this application. As shown in FIG. 11, the apparatus in this embodiment may be applied to the foregoing communications device. The apparatus includes a processing module 1101 and a receiving module 1102. The processing module 1101 is configured to: determine a first parameter, where the first parameter corresponds to a first WUS resource, and the first WUS resource is a WUS resource that is configured by a network device and that is associated with a paging occasion (PO); and generate a first WUS sequence based on the first parameter. The receiving module 1102 is configured to: monitor the first WUS sequence on the first WUS resource; and detect a PDCCH at the PO when the first WUS sequence on the first WUS resource is detected.

In a possible implementation, the processing module 1101 is further configured to: obtain a first Gold seed through calculation based on a first parameter; and obtain the first WUS sequence through calculation based on the first Gold seed.

In a possible implementation, the first Gold seed obtained through calculation based on the first parameter satisfies the following formula:

$$c_{init\_WUS} = N_{ID} \times 2^{29} + \\ (N_{ID}^{Ncell} + 1) \times \left( \left( 10 n_{f\_start\_PO} + \left\lfloor \frac{n_{s\_start\_PO}}{2} \right\rfloor \right) \bmod 2048 + 1 \right) \times 2^9 + N_{ID}^{Ncell},$$

where
$c_{init\_WUS}$ represents the first Gold seed, $N_{ID}$ represents the first parameter, $N_{ID}^{Ncell}$ represents a cell identifier, $n_{f\_start\_PO}$ represents a frame number of a first frame in which a PO corresponding to the first WUS sequence is located, and $n_{s\_start\_PO}$ represents a slot number of a first slot in which the PO corresponding to the first WUS sequence is located.

In a possible implementation, the processing module 1101 is further configured to: obtain a first cover mode through calculation based on a first parameter; and obtain the first WUS sequence through calculation based on the first cover mode.

In a possible implementation, the first cover mode obtained through calculation based on the first parameter satisfies the following formula:

$$C_{gold}(N_{ID}) = (1 - 2x_0(m \bmod 127))(1 - 2x_1((m + m_1) \bmod 127))$$

$C_{gold}(N_{ID})$ represents the first cover mode, $N_{ID}$ represents the first parameter, $$m_1 = N_{ID} \left\lfloor \frac{127}{N_{total}} \right\rfloor,$$

$N_{total} = N$, $x_0(i+7) = (x_0(i+4) + x_0(i)) \bmod 2$, $x_1(i+7) = (x_1(i+4) + x_1(i)) \bmod 2$, both initial values of $x_0(i)$ and $x_1(i)$ are [0000001], N indicates a quantity of parameters determined by the network device for one PO, and N is an integer greater than or equal to 1.

In a possible implementation, the processing module 1101 is further configured to: generate a Gold sequence; and intercept a part of sequence corresponding to the first parameter from the Gold sequence, to obtain the first WUS sequence through calculation.

The apparatus in this embodiment may be configured to execute the technical solution in the method embodiment shown in FIG. 7. Implementation principles and technical effects are similar to those in the method embodiment, and details are not described herein again.

Figure 12:
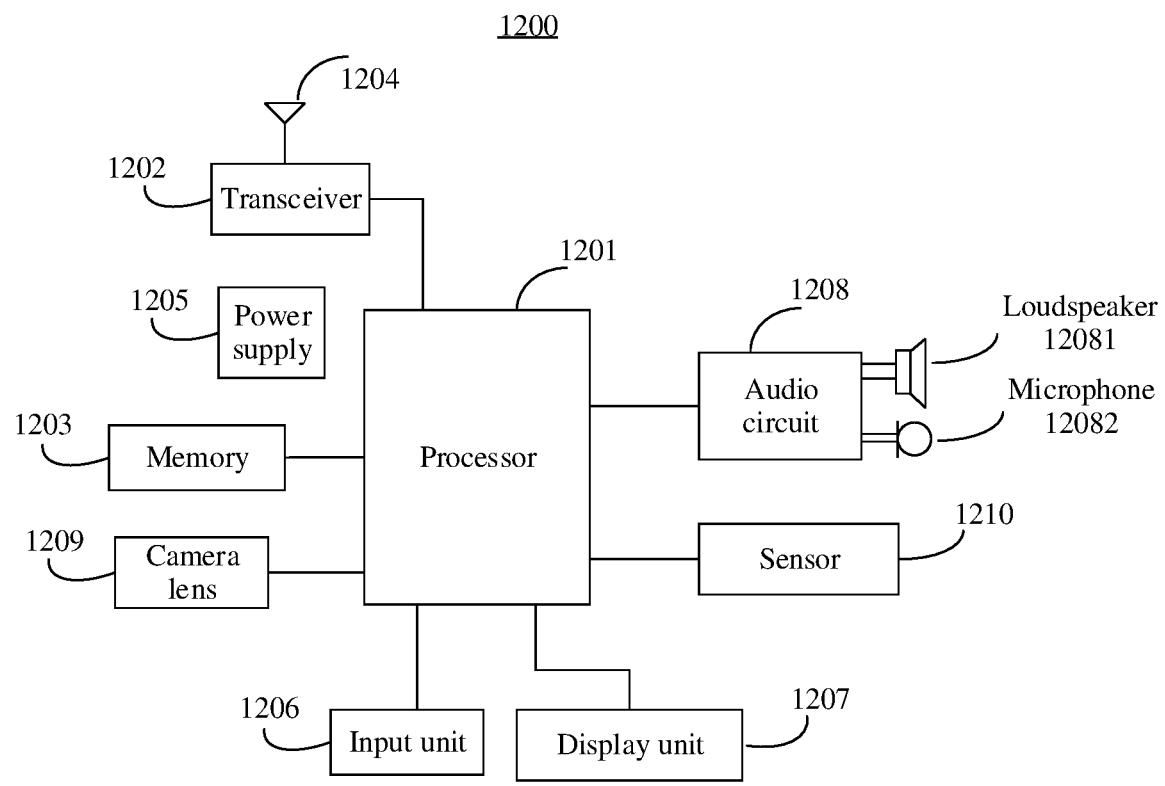
FIG. 12 is a schematic diagram of a structure of a communications device according to an embodiment of this application.

FIG. 12 is a schematic diagram of a structure of a communications device according to an embodiment of this application. As shown in FIG. 12, the communications device 1200 may be the communications device in the foregoing embodiments. The communications device 1200 includes a processor 1201 and a transceiver 1202.

Optionally, the communications device 1200 further includes a memory 1203. The processor 1201, the transceiver 1202, and the memory 1203 may communicate and transmit a control signal and/or data signal with each other through an internal connection channel.

The memory 1203 is configured to store a computer program. The processor 1201 is configured to execute the computer program stored in the memory 1203, thereby implementing various functions in the foregoing apparatus embodiment.

Specifically, the processor 1201 may be configured to perform the operations and/or processing performed by the processing module 1001/1101 in the apparatus embodiment (for example, FIG. 3), and the transceiver 1202 is configured to perform the operations and/or processing performed by the receiving module 1102 and the sending module 1002.

Optionally, the memory 1203 may alternatively be integrated in the processor 1201, or may be independent of the processor 1201.

Optionally, the communications device 1200 may further include an antenna 1204, configured to transmit a signal output by the transceiver 1202. Alternatively, the transceiver 1202 receives a signal through the antenna.

Optionally, the communications device 1200 may further include a power supply 1205, configured to supply power to various components or circuits in the device.

In addition, to further optimize functionality of the communications device, the communications device 1200 may further include one or more of an input unit 1206, a display unit 1207 (which may also be considered an output unit), an audio circuit 1208, a camera lens 1209, and a sensor 1210. The audio circuit may further include a loudspeaker 12081, a microphone 12082, and the like. Details are not described again.

Figure 13:
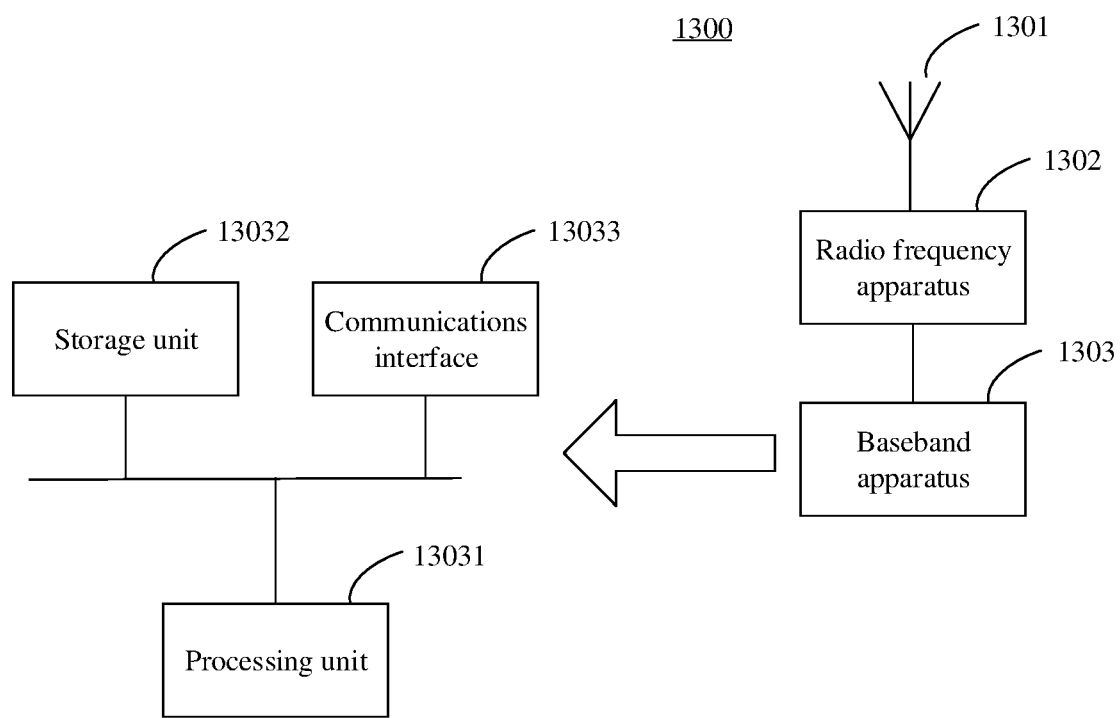
FIG. 13 is a schematic diagram of a structure of a network device according to an embodiment of this application.

FIG. 13 is a schematic diagram of a structure of a network device according to an embodiment of this application. As shown in FIG. 13, the network device 1300 may be the network device in the foregoing embodiments. The network device 1300 includes an antenna 1301, a radio frequency apparatus 1302, and a baseband apparatus 1303. The antenna 1301 is connected to the radio frequency apparatus 1302. In uplink, the radio frequency apparatus 1302 receives a signal from a communications device through the antenna 1301, and sends the received signal to the baseband apparatus 1303 for processing. In downlink, the baseband apparatus 1303 generates a signal to be sent to a communications device, and sends the generated signal to the radio frequency apparatus 1302. The radio frequency apparatus 1302 sends the signal through the antenna 1301.

The baseband apparatus 1303 may include one or more processing units 13031. The processing unit 13031 may be specifically a processor.

In addition, the baseband apparatus 1303 may further include one or more storage units 13032 and one or more communications interfaces 13033. The storage unit 13032 is configured to store a computer program and/or data. The communications interface 13033 is configured to exchange information with the radio frequency apparatus 1302. The storage unit 13032 may be specifically a memory, and the communications interface 13033 may be an input/output interface or a transceiver circuit.

Optionally, the storage unit 13032 may be a storage unit located on a same chip as the processing unit 13031, namely, an on-chip storage unit, or may be a storage unit located on a different chip from the processing unit 13031, namely, an off-chip storage unit. This is not limited in embodiments of the present disclosure.

An embodiment of this application further provides a computer-readable storage medium. The computer-readable storage medium stores a computer program. When the computer program is executed by a computer, the computer is enabled to perform the steps and/or the processing in any one of the foregoing method embodiments.

An embodiment of this application further provides a computer program product. The computer program product includes computer program code. When the computer program code is run on a computer, the computer is enabled to perform the steps and/or the processing in any one of the foregoing method embodiments.

In an example implementation process, the steps in the foregoing method embodiments may be completed by using a hardware integrated logic circuit in a processor or instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The general-purpose processor may be a microprocessor, or the processor may be any conventional processor, or the like. The steps of the methods disclosed in the embodiments of this application may be directly executed and completed by using a hardware encoding processor, or may be executed and completed by using a combination of hardware and software modules in the encoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps of the foregoing methods in combination with the hardware of the processor.

The memory mentioned in the foregoing embodiments may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), and is used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that, the memory in the system and the method described in this specification includes but is not limited to these memories and any memory of another proper type.

A person of ordinary skill in the art may be aware that, in combination with the examples described in the embodiments disclosed in this specification, units and algorithm steps can be implemented by electronic hardware or a combination of computer software and electronic hardware. Whether the functions are performed by using hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments.

In the embodiments provided in this application, it should be understood that the disclosed system, apparatus, and method may be implemented in another manner. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electrical, mechanical, or other forms.

Units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes instructions for instructing a computer device (a personal computer, a server, a network device, or the like) to perform all or some of the steps of the methods described in the embodiments of this application. The foregoing storage medium includes any medium, for example, a USB flash drive, a removable hard disk, a read-only memory (ROM), a random access memory (RAM), a magnetic disk, or an optical disc, that can store program code.

The foregoing descriptions are merely non-limiting examples of specific implementations and are not intended to limit the protection scope, which is intended to cover any variation or replacement readily determined by a person of ordinary sill in the art. Therefore, the claims shall define the protection scope.

What is claimed is:

1. A method for sending a wake-up signal sequence, comprising:
    determining N parameters/parameter for one paging occasion (PO), wherein the N parameters/parameter correspond(s) to N wake-up signal (WUS) resources/resource in WUS resources associated with the PO, N is an integer greater than or equal to 1, and when N>1, the N parameters are different from each other;
    generating N WUS sequence sets/set based on the N parameters/parameter, wherein the N WUS sequence sets/set are separately transmitted on associated resource(s) in the N WUS resources/resource, and each of the N WUS sequence sets/set comprises at least one WUS sequence; and
    sending at least one sequence in a first WUS sequence set on a first WUS resource, wherein the first WUS resource is one of the N WUS resources/resource, and the first WUS sequence set is a WUS sequence set transmitted on the first WUS resource,
    wherein the generating of the N WUS sequence sets/set based on the N parameters/parameter comprises:
    obtaining a first Gold seed through calculation based on a first parameter, wherein the first parameter corresponds to the first WUS resource; and
    obtaining the first WUS sequence set through calculation based on the first Gold seed.

2. The method according to claim 1, wherein the first WUS resource is associated with at least one communications device group, and at least one WUS sequence in the first WUS sequence set corresponds to the at least one communications device group.

3. The method according to claim 1, wherein the first Gold seed obtained through calculation based on the first parameter satisfies the following formula:

$$c_{init\_WUS} = N_{ID} \times 2^{29} +$$
$$(N_{ID}^{Ncell} + 1) \times \left( \left( 10 n_{f\_start\_PO} + \left\lfloor \frac{n_{s\_start\_PO}}{2} \right\rfloor \right) \bmod 2048 + 1 \right) \times 2^9 + N_{ID}^{Ncell},$$

wherein
    $c_{init\_WUS}$ represents the first Gold seed, $N_{ID}$ represents the first parameter, $N_{ID}^{Ncell}$ represents a cell identifier, $n_{f\_start\_PO}$ represents a frame number of a first frame in which a PO corresponding to the first WUS sequence set is located, and $n_{s\_start\_PO}$ represents a slot number of a first slot in which the PO corresponding to the first WUS sequence set is located.

4. The method according to claim 1, wherein the generating of the N WUS sequence sets/set based on the N parameters/parameter comprises:
    obtaining a first cover mode through calculation based on a first parameter, wherein the first parameter corresponds to the first WUS resource; and
    obtaining the first WUS sequence set through calculation based on the first cover mode.

5. The method according to claim 1, wherein N is equal to 2, the N WUS resources comprise the first WUS resource and a second WUS resource, and the first WUS resource and the second WUS resource correspond to a same type of gap of a same PO.

6. An apparatus for sending a wake-up signal sequence, comprising:
    at least one processor; and
    one or more memories coupled to the at least one processor and storing programming instructions that, when executed by the at least one processor, cause the apparatus to:
    determine N parameters/parameter for one paging occasion (PO), wherein the N parameters/parameter correspond(s) to N wake-up signal (WUS) resources/resource in WUS resources associated with the PO, N is an integer greater than or equal to 1, and when N>1, the N parameters/parameter are different from each other;
    generate N WUS sequence sets/set based on the N parameters/parameter, wherein the N WUS sequence sets/set are separately transmitted on associated resource(s) in the N WUS resources/resource, and each of the N WUS sequence sets/set comprises at least one WUS sequence; and
    send at least one sequence in a first WUS sequence set on a first WUS resource, wherein the first WUS resource is one of the N WUS resources/resource, and the first WUS sequence set is a WUS sequence set transmitted on the first WUS resource,
    wherein the programming instructions, when executed by the at least one processor, further cause the apparatus to:
    obtain a first Gold seed through calculation based on a first parameter, wherein the first parameter corresponds to the first WUS resource; and
    obtain the first WUS sequence set through calculation based on the first Gold seed.

7. The apparatus according to claim 6, wherein the first WUS resource is associated with at least one communications device group, and at least one WUS sequence in the first WUS sequence set corresponds to the at least one communications device group.

8. The apparatus according to claim 6, wherein the first Gold seed obtained through calculation based on the first parameter satisfies the following formula:

$$c_{init\_WUS} = N_{ID} \times 2^{29} +$$
$$(N_{ID}^{Ncell} + 1) \times \left( \left( 10 n_{f\_start\_PO} + \left\lfloor \frac{n_{s\_start\_PO}}{2} \right\rfloor \right) \bmod 2048 + 1 \right) \times 2^9 + N_{ID}^{Ncell},$$

wherein $c_{init\_WUS}$ represents the first Gold seed, $N_{ID}$ represents the first parameter, $N_{ID}^{Ncell}$ represents a cell identifier, $n_{f\_start\_PO}$ represents a frame number of a first frame in which a PO corresponding to the first WUS sequence set is located, and $n_{s\_start\_PO}$ represents a slot number of a first slot in which the PO corresponding to the first WUS sequence set is located.

9. The apparatus according to claim 6, wherein the programming instructions, when executed by the at least one processor, further cause the apparatus to: obtain a first cover mode through calculation based on a first parameter, wherein the first parameter corresponds to the first WUS resource; and obtain the first WUS sequence set through calculation based on the first cover mode.

10. The apparatus according to claim 6, wherein N is equal to 2, the N WUS resources comprise the first WUS resource and a second WUS resource, and the first WUS resource and the second WUS resource correspond to a same type of gap of a same PO.

11. A non-transitory storage medium storing information comprising instructions that, when executed by at least one processor, control the at least one processor to perform operations comprising:

determining N parameters/parameter for one paging occasion (PO), wherein the N parameters/parameter correspond(s) to N wake-up signal (WUS) resources/resource in WUS resources associated with the PO, N is an integer greater than or equal to 1, and when N>1, the N parameters are different from each other;

generating N WUS sequence sets/set based on the N parameters/parameter, wherein the N WUS sequence sets/set are separately transmitted on associated resource(s) in the N WUS resources/resource, and each of the N WUS sequence sets/set comprises at least one WUS sequence; and sending at least one sequence in a first WUS sequence set on a first WUS resource, wherein the first WUS resource is one of the N WUS resources/resource, and the first WUS sequence set is a WUS sequence set transmitted on the first WUS resources, wherein the generating of the N WUS sequence sets/set based on the N parameters/parameter comprises:

obtaining a first Gold seed through calculation based on a first parameter, wherein the first parameter corresponds to the first WUS resource; and obtaining the first WUS sequence set through calculation based on the first Gold seed.

12. The non-transitory storage medium according to claim 11, wherein the first WUS resource is associated with at least one communications device group, and at least one WUS sequence in the first WUS sequence set corresponds to the at least one communications device group.

13. The non-transitory storage medium according to claim 11, wherein the first Gold seed obtained through calculation based on the first parameter satisfies the following formula:

$$c_{init\_WUS} = N_{ID} \times 2^{29} +$$
$$(N_{ID}^{Ncell} + 1) \times \left( \left( 10 n_{f\_start\_PO} + \left\lfloor \frac{n_{s\_start\_PO}}{2} \right\rfloor \right) \bmod 2048 + 1 \right) \times 2^9 + N_{ID}^{Ncell},$$

wherein $c_{init\_WUS}$ represents the first Gold seed, $N_{ID}$ represents the first parameter, $N_{ID}^{Ncell}$ represents a cell identifier, $n_{f\_start\_PO}$ represents a frame number of a first frame in which a PO corresponding to the first WUS sequence set is located, and $n_{s\_start\_PO}$ represents a slot number of a first slot in which the PO corresponding to the first WUS sequence set is located.

14. The non-transitory storage medium according to claim 11, wherein the generating of the N WUS sequence sets/set based on the N parameters/parameter comprises:

obtaining a first cover mode through calculation based on a first parameter, wherein the first parameter corresponds to the first WUS resource; and obtaining the first WUS sequence set through calculation based on the first cover mode.

15. The non-transitory storage medium according to claim 11, wherein N is equal to 2, the N WUS resources comprise the first WUS resource and a second WUS resource, and the first WUS resource and the second WUS resource correspond to a same type of gap of a same PO.

\* \* \* \* \*

UNITED STATES PATENT AND TRADEMARK OFFICE
CERTIFICATE OF CORRECTION

| | | |
|---|---|---|
| PATENT NO. | : 12,150,059 B2 | Page 1 of 1 |
| APPLICATION NO. | : 17/671690 | |
| DATED | : November 19, 2024 | |
| INVENTOR(S) | : Xiang Mi | |

It is certified that error appears in the above-identified patent and that said Letters Patent is hereby corrected as shown below:

In the Claims

Column 26, Claim 11, Line 2, change "resources" to --resource--.

Signed and Sealed this
Seventeenth Day of December, 2024

Derrick Brent
*Acting Director of the United States Patent and Trademark Office*